L. R. DUDLEY.
SHOCK ABSORBER.
APPLICATION FILED MAR. 29, 1913.
1,125,012.
Patented Jan. 12, 1915.
2 SHEETS—SHEET 2.
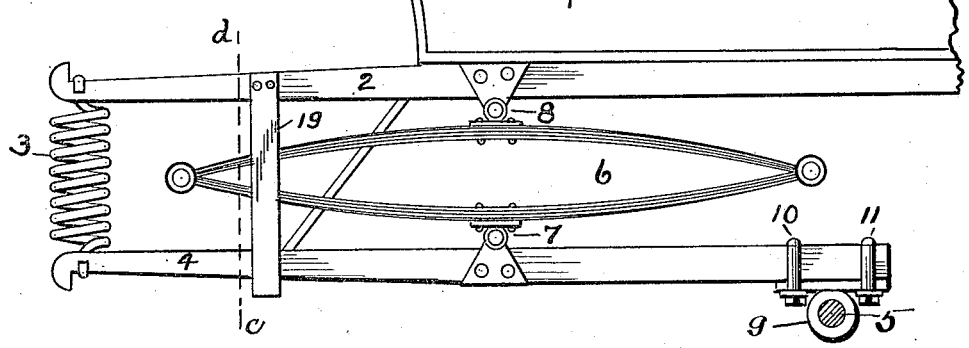
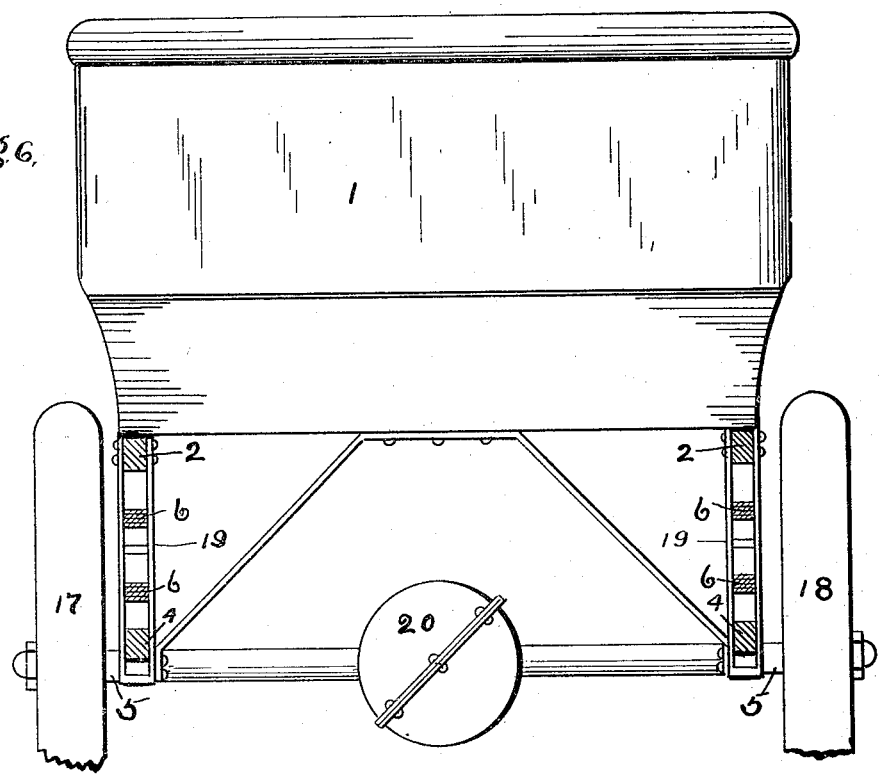

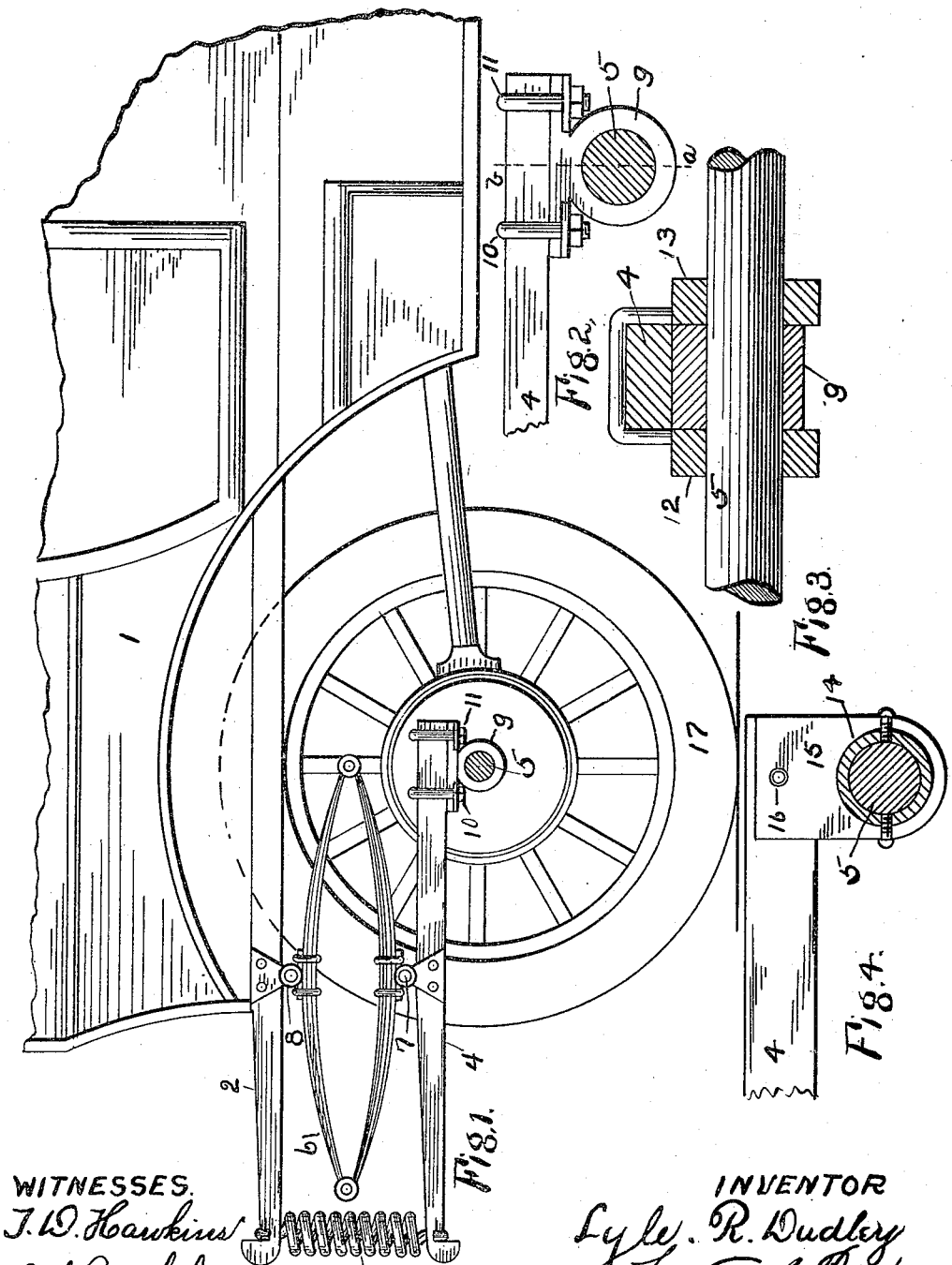

UNITED STATES PATENT OFFICE.

LYLE R. DUDLEY, OF SAN FRANCISCO, CALIFORNIA.

SHOCK-ABSORBER.

1,125,012.  Specification of Letters Patent.  Patented Jan. 12, 1915.

Application filed March 29, 1913. Serial No. 757,522.

*To all whom it may concern:*

Be it known that I, LYLE R. DUDLEY, residing in the city and county of San Francisco, State of California, have invented certain new and useful Improvements in Shock-Absorbers, whereof the following is a specification.

My invention relates to the art of traveling by wheeled vehicles, especially to passenger travel, and particularly to means for avoiding shocks to the body of said vehicles from inequalities of surface in the road. Such inequalities exist in the form of ruts and sudden elevations, the former tending to shock the vehicle in falling and the latter by a too rapid lifting; and the object of my invention is to provide a new and improved shock absorber which shall counteract both forms of shock.

With the said object in view my invention consists in the combination with a lever having one end suspended on the vehicle axle, and its other end connected with an arm extending from the body, said connection being made through a spiral spring; and an elliptical spring joining the center of said lever to a point directly above on the body.

It also consists in the novel parts, combinations and arrangements set forth in the following description, particularly pointed out in the claims at the end hereof, and illustrated in the accompanying two sheets of drawing of which—

Figure 1, is a broken view in elevation of the rear part of a wheeled vehicle such as an automobile, with one of the wheels removed to show one of my shock absorbers in place; Fig. 2, is a somewhat enlarged view of that portion of the lever which lies near the axle, showing its mode of attachment thereto; Fig. 3, is a sectional view taken along the line *a—b* of Fig. 2, with the addition of collars for preventing longitudinal motion and showing a partial elevation of the axle; Fig. 4, is a view similar to Fig. 2 showing a modification for securing the device to vehicles of the floating axle type; Fig. 5, is a broken view somewhat enlarged of the rear portion of an automobile provided with my invention and showing means for holding the elliptical spring in position and Fig. 6, is a rear end elevation of an automobile, showing a section of both shock absorbers and holding means taken along the line *c—d* of Fig. 5.

The same symbol of reference marks the same part in whichever view said part may appear.

Referring to the drawing, 1 is the upper frame work of a wheeled vehicle, in the present case an automobile, to which I shall particularly refer hereafter, and from said frame arms 2 extend backward. A spiral spring 3 is hooked to the end of said arm and a lever 4, at one of its extremities, also engages said springs. Said lever is supported on an axle 5 at its other end. Near the middle point of the lever 4 an elliptical spring 6 is pivoted; and said spring is also pivoted to the upper frame, the pivots being marked 7 and 8 respectively. The axle end of the lever 4 is secured to the axle by the collar 9, which is free to rotate on said axle, and is fixed to said lever by bolts 10 and 11; and is secured against longitudinal motion on the axle 5 by the collars 12 and 13 shown exclusively in Fig. 3.

In the modification shown in Fig. 4, 14 is the housing of the axle on which is riveted the plate 15; the lever 4 being pivoted to said plate at the point 16. The vehicle wheels 17 and 18 are mounted on axle 5. The weight of the body is normally supported on the elliptical springs 6, which are sustained by the levers 4, spiral springs 3 and axle 5.

Referring now to Figs. 5 and 6 I have shown in these figures means for holding the springs 6 in alinement with arms 2 and levers 4 which consists of straps 19 bent in the form of a U shape and secured at its open end to the arms 2 and between its projecting members the elliptical spring 6 and lever 4 are freely held in position.

The mode of operation of my device is as follows: If the vehicle wheels strike a rut, the shock of contact is first partially absorbed by compressing springs 6, and then by extending springs 3, the pivots 7 and 8 acting as fulcrums between springs 3 and the axle. When an obstruction is encountered, springs 3 are the first to be affected, being subjected to tension through lever 4; and springs 6 exert a supplementary reaction through their compression.

In the construction of my device I have considered that the wheels 17 and 18 will travel upward and downward in a path approximating the arc of a circle; and I have therefore pivoted the springs 6 at the points 7 and 8 so that the disalinement of the same from the vertical may be accomplished, and still keep the wheel within the true arc upon which it must travel to avoid throwing out of engagement the differential gears in casing 20.

Having thus described my invention and believing I have produced useful and novel improvements in the art to which it appertains let it be understood that I do not wish to be limited to the exact construction and arrangement of the several parts composing the same as many changes can be made without departing from the spirit thereof but what I claim and desire to secure by United States Letters Patent is:—

Claims—

1. In combination with the frame work of a vehicle and the axle wheels thereof, a shock-absorber, comprising arms projecting outwardly from the rear end of said frame work, levers secured to said axle and projecting outwardly parallel to said arms, tension springs secured at the outward projecting rear ends of said arms and levers and compression springs secured between said arms and levers.

2. In combination with the frame work of a vehicle and the axle wheels thereof, a shock-absorber comprising arms projecting outwardly from the rear end of said frame work, levers secured to said axle and projecting outwardly parallel to said arms, spiral springs secured at the outward projecting rear ends of said arms and levers and elliptical springs between said arms and levers and secured thereon about the longitudinal center of said levers.

3. In combination with the frame work of a vehicle and the axle wheels thereof, a shock-absorber comprising arms projecting outwardly from the rear end of said frame work and levers secured to said axle and projecting parallel to said arms, spiral springs secured at the outward projecting ends of said arms and levers, elliptical springs secured between said arms and levers and a U-shaped device for holding said elliptical springs in alinement with said arms and levers.

In testimony that I claim the foregoing I have hereto set my hand in the presence of witnesses, this 22nd day of March, 1913.

LYLE R. DUDLEY.

Witnesses:
C. V. DUDLEY,
B. C. CHESTER.

Copies of this patent may be obtained for five cents each, by addressing the "Commissioner of Patents, Washington, D. C."